United States Patent
Powell et al.

(10) Patent No.: US 9,568,802 B1
(45) Date of Patent: Feb. 14, 2017

(54) SPATIAL ISOLATION OF ENERGY ASSOCIATED WITH A SCENE

(71) Applicant: Lockheed Martin Corporation, Bethesda, MD (US)

(72) Inventors: Calvin L. Powell, Orlando, FL (US); Mark T. Myers, Orlando, FL (US); Trisha Fish, Merritt Island, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 322 days.

(21) Appl. No.: 14/210,679

(22) Filed: Mar. 14, 2014

Related U.S. Application Data

(60) Provisional application No. 61/787,511, filed on Mar. 15, 2013.

(51) Int. Cl.
    *H01J 3/14*     (2006.01)
    *G02F 1/29*     (2006.01)
    *G02B 26/08*     (2006.01)

(52) U.S. Cl.
    CPC .............. *G02F 1/29* (2013.01); *G02B 26/0833* (2013.01)

(58) Field of Classification Search
    CPC ......................... G02B 26/0833; G02B 6/3516
    USPC ........................................................ 250/234
    See application file for complete search history.

(56) References Cited

U.S. PATENT DOCUMENTS

| | | | |
|---|---|---|---|
| 7,219,086 B2 | 5/2007 | Geshwind et al. | |
| 7,692,841 B2 | 4/2010 | Kaeriyama | |
| 7,973,834 B2 | 7/2011 | Yang | |
| 8,102,583 B2 | 1/2012 | Cook | |
| 2011/0074983 A1* | 3/2011 | Bush | G03B 39/06 348/241 |

OTHER PUBLICATIONS

Beasley, D. Brett et al., "Advancements in the micromirror array projector technology II," SPIE Proceedings, vol. 5092, Technologies for Synthetic Environments: Hardware-in-the-Loop Testing VIII, Sep. 12, 2003, SPIE, 12 pages.

Goldstein, Neil et al., "DMD-based adaptive spectral imagers for hyperspectral imagery and direct detection of spectral signatures," SPIE Proceedings, vol. 7210, Emerging Digital Micromirror Device Based Systems and Applications, Jan. 24, 2009, SPIE, 10 pages.

(Continued)

*Primary Examiner* — Thanh Luu
(74) *Attorney, Agent, or Firm* — Withrow & Terranova, PLLC

(57) ABSTRACT

Mechanisms for spatially isolating a region of interest (ROI) in a scene are disclosed. A first sensor generates sensor data that quantifies energy received from a scene within a field of view (FOV) of the first sensor to generate a real-time FOV full motion video. A processor analyzes the sensor data to identify a first ROI during a wait period of a frame period of the first sensor. A first subset of micromirrors in a micromirror array that is directed toward the scene is identified. The first subset of micromirrors receives energy from the first ROI. At least one micromirror in the first subset is controlled to move from a primary position of the at least one micromirror to a first tilt position of the at least one micromirror to reflect the energy from the first ROI toward a second sensor, the first ROI being spatially isolated from the real-time FOV full motion video.

19 Claims, 16 Drawing Sheets

(56) References Cited

OTHER PUBLICATIONS

Hicks, R. Andrew et al., "Micromirror array theory for imaging sensors," SPIE Proceedings, vol. 5721, MOEMS Display and Imaging Systems III, Jan. 22, 2005, SPIE, 8 pages.
Waldis, Severin et al., "Tiny mirrors for huge telescopes," SPIE Newsroom, 10.1117/2.1200705.0734, 2007, SPIE, 3 pages.

* cited by examiner

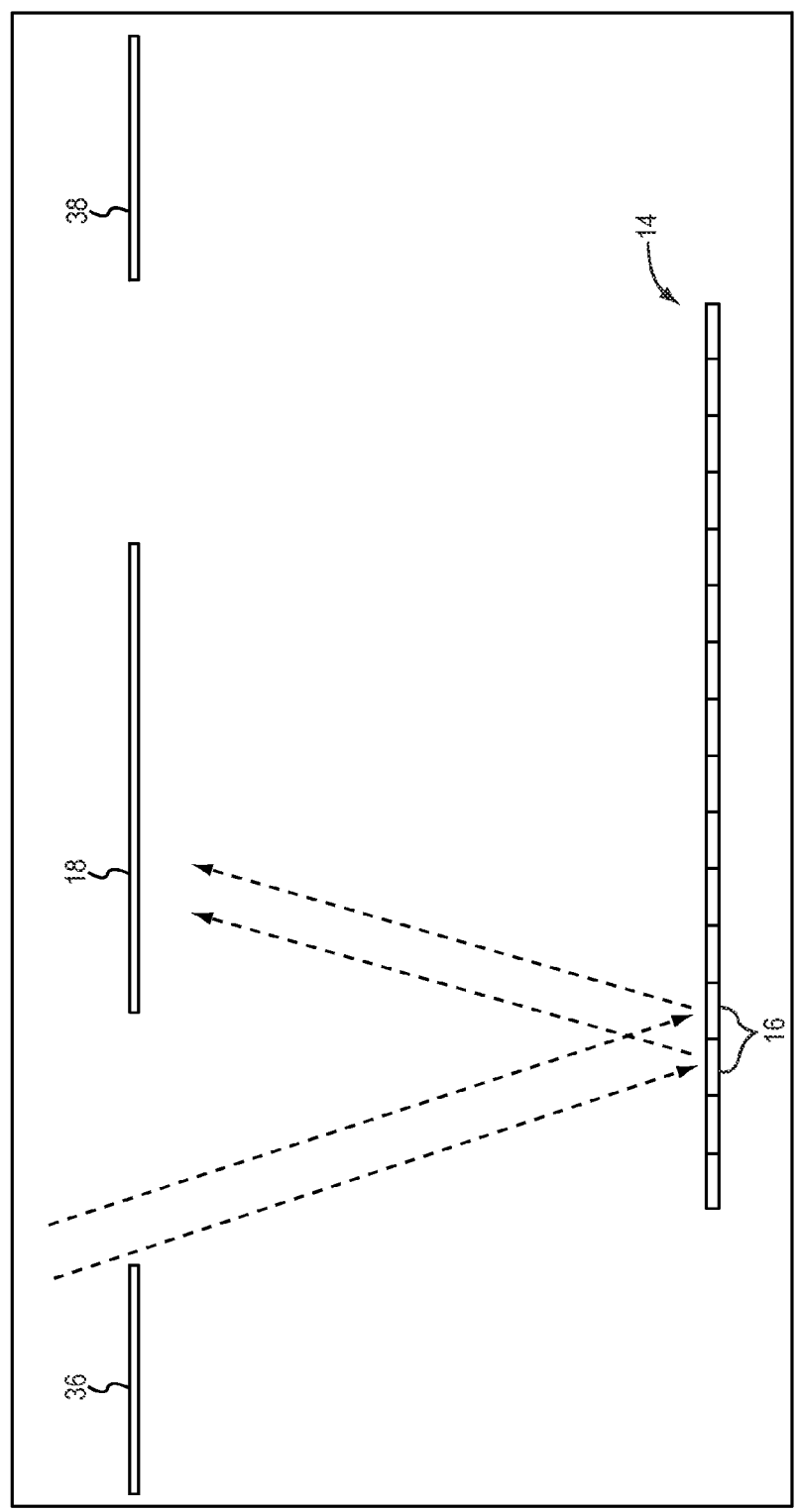

SPATIAL ISOLATION OF ENERGY ASSOCIATED WITH A SCENE

This application claims the benefit of provisional patent application Ser. No. 61/787,511, filed Mar. 15, 2013, entitled "SPATIAL ISOLATION OF TARGETED ENERGY ASSOCIATED WITH A SCENE," the disclosure of which is hereby incorporated herein by reference in its entirety.

TECHNICAL FIELD

The embodiments relate generally to spatially isolating energy associated with a region of interest in a scene, and in particular, to directing the spatially isolated energy to a sensor for analysis.

BACKGROUND

Identification and classification of objects contained within a field of view of an image sensor is important in a number of contexts, including, for example, targeting systems used in aircraft. Analyzing energy emitted or reflected by a region of interest (ROI) in a scene may be useful in determining, for example, a range or distance to the ROI, a chemical composition of the ROI, an extent of the ROI, or a variety of other information about the ROI, that may be used, for example to determine whether the ROI poses a threat. The information that can be gleaned from such ROI may require many different types of sensors, including spectral sensors, range sensors, multiple image sensors, such as visible image sensors and infrared image sensors, and the like. Typically, each different sensor may require a corresponding lens system and other mechanical and/or electronic components that take up substantial space, and increase costs. On an aircraft, space is at a minimum. Accordingly, there is a need for mechanisms for analyzing energy associated with a scene that minimize space requirements and reduce costs.

SUMMARY

The embodiments relate to spatial isolation of energy associated with a region of interest (ROI) in a scene. In particular, the embodiments facilitate a multiple sensor system wherein energy associated with an ROI may be directed by a micromirror array to multiple different sensors. In one embodiment, a first sensor generates sensor data that quantifies energy received from a scene within a field of view (FOV) of the first sensor to generate a real-time FOV full motion video. The first sensor, for example, may comprise an image sensor that quantifies energy in a visible spectrum, or may comprise a focal plane array that quantifies energy in an infrared spectrum. A processor analyzes the sensor data to identify a first ROI during a wait period of a frame period of the first sensor. The first ROI may comprise, by way of non-limiting example, a portion of the landscape, or an object, such as a moving or a stationary object. A first subset of micromirrors in a micromirror array that is directed toward the scene is identified. The first subset of micromirrors receives energy from the first ROI. At least one micromirror in the first subset is controlled to move from a primary position of the at least one micromirror to a first tilt position of the at least one micromirror to reflect the energy from the first ROI toward a second sensor, the first ROI being spatially isolated from the real-time FOV full motion video.

The second sensor may comprise any suitable type of sensor capable of receiving energy from the scene and deducing information based on such energy, including, by way of non-limiting example, a ranging sensor, a Doppler sensor, a vibration sensor, a spectral sensor, or an image sensor in any desired wavelength.

In one embodiment, the first sensor generates new sensor data during each frame period of a plurality of frame periods. Each frame period comprises an integration period during which detector elements of the first sensor are integrating photons, and the wait period, during which the detector elements are not integrating photons. The at least one micromirror in the first subset is controlled to move from the primary position of the at least one micromirror to the first tilt position of the at least one micromirror to reflect the energy toward the second sensor during the wait period of a first frame period. The at least one micromirror may be controlled to return to the primary position of the at least one micromirror prior to a next frame period that immediately follows the first frame period. In this manner, the energy of the first ROI can be reflected toward the second sensor without affecting the resolution, frame rate operation of the first sensor, or otherwise interrupt the generation of a real-time FOV full motion video by the first sensor. This processing may occur iteratively, for each frame period of a plurality of successive frame periods.

Multiple ROIs may be identified, and energy associated with such ROIs reflected toward the second sensor, or toward other sensors. In one embodiment, the processor analyzes the sensor data to identify a second ROI. A second subset of the plurality of micromirrors in the micromirror array that receive energy from the second ROI is identified. At least one micromirror in the second subset is controlled to move from a primary position of the at least one micromirror in the second subset to a first tilt position of the at least one micromirror in the second subset to reflect the energy from the second ROI toward a third sensor.

In some embodiments, different subsets of the micromirror array may be controlled to move from primary positions to tilt positions during a same wait period of a frame period. For example, at least one micromirror in the first subset of micromirrors can be controlled to move from the primary position of the at least one micromirror in the first subset of micromirrors to the first tilt position of the at least one micromirror to reflect the energy toward the second sensor during a wait period of a first frame period, and the at least one micromirror in the second subset of micromirrors can be controlled to move from the primary position of the at least one micromirror in the second subset of micromirrors to a tilt position of the at least one micromirror to reflect the energy toward the third sensor during the wait period of the first frame period.

In one embodiment, the first subset of the plurality of micromirrors comprises a plurality of columns of micromirrors. Each respective column of micromirrors of the plurality of columns of micromirrors is successively controlled to concurrently move from respective primary positions of the micromirrors in the respective column to respective first tilt positions of the micromirrors in the respective column to reflect the energy from the first ROI toward the second sensor.

In one embodiment, all the columns of micromirrors are successively controlled to reflect energy toward the second sensor during a same wait period of a frame period. In other embodiments, each column of micromirrors is successively controlled to reflect energy toward the second sensor during different wait periods of different frame periods.

In some embodiments, the energy from a same ROI may be successively sent to different sensors. For example, the at least one micromirror in the first subset of micromirrors can be controlled to move from the primary position of the at least one micromirror to the first tilt position of the at least one micromirror to reflect the energy from the first ROI toward the second sensor during the wait period of the first frame period, and the at least one micromirror in the first subset of micromirrors may then be subsequently controlled to move to a second tilt position of the at least one micromirror to reflect the energy from the first ROI toward the third sensor during the wait period of the first frame period.

In another embodiment, a system is provided. The system includes a first sensor configured to generate sensor data that quantifies energy received from a scene within a FOV of the sensor. The system includes a micromirror array comprising a plurality of micromirrors that is directed toward the scene to generate a real-time FOV full motion video. A processor is configured to analyze the sensor data to identify a first ROI and identify a first subset of micromirrors of a plurality of micromirrors that receive energy from the first ROI during a wait period of a frame period of the sensor. The processor is further configured to control at least one micromirror in the first subset to move from a primary position of the at least one micromirror to a first tilt position of the at least one micromirror to reflect the energy from the first ROI toward a second sensor, the first ROI being spatially isolated from the real-time FOV full motion video.

Those skilled in the art will appreciate the scope of the disclosure and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 2A-2C are block diagrams illustrating micromirrors in various positions, according to one embodiment;

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first subset" and "second subset," and does not imply a priority, a type, an importance, or other attribute, unless otherwise stated herein. The term "about" used herein in conjunction with a numeric value means any value that is within a range of ten percent greater than or ten percent less than the numeric value.

Figure 1A:
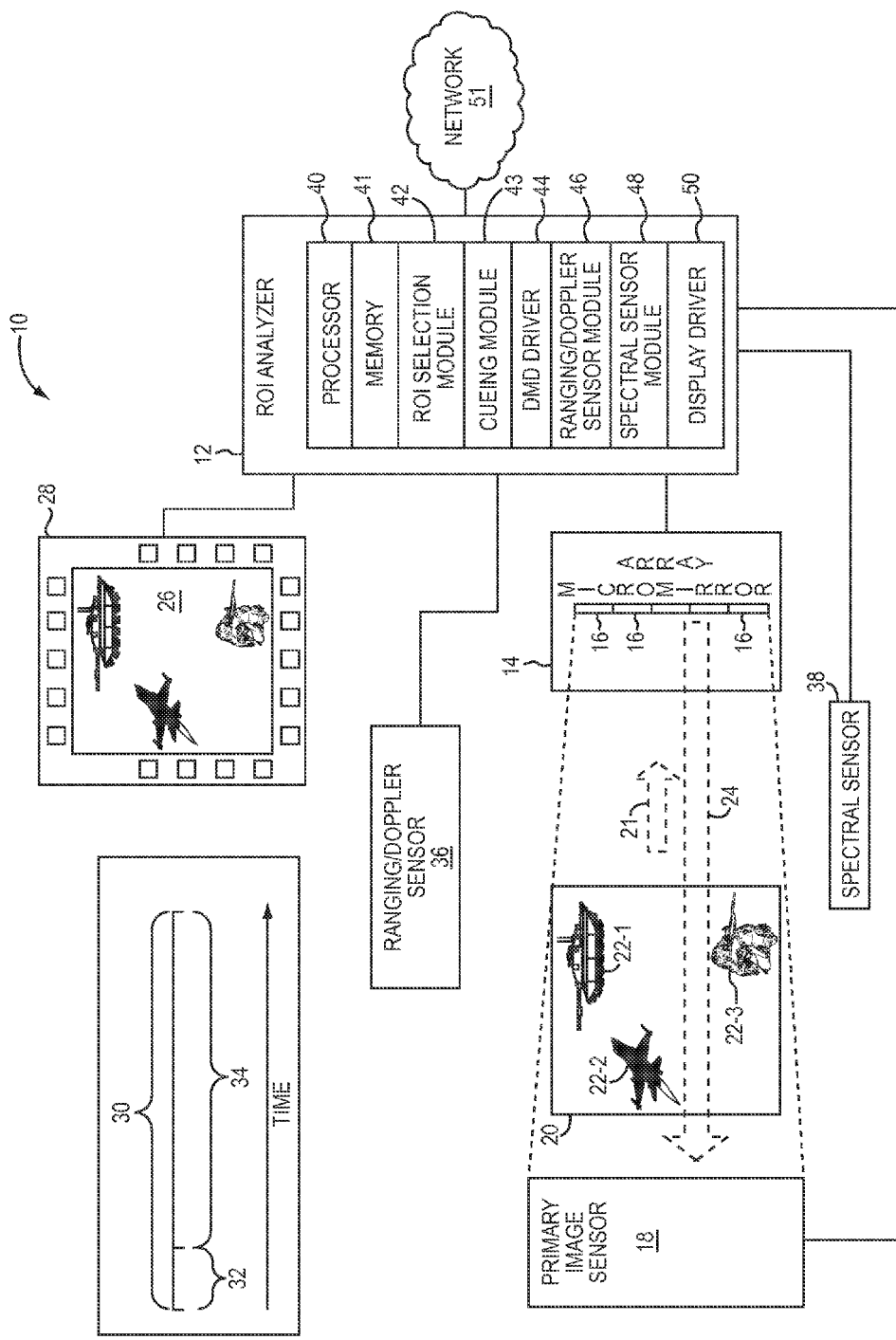
FIGS. 1A-1C are block diagrams of a system at three successive points in time illustrating one embodiment.
Figure 1B:
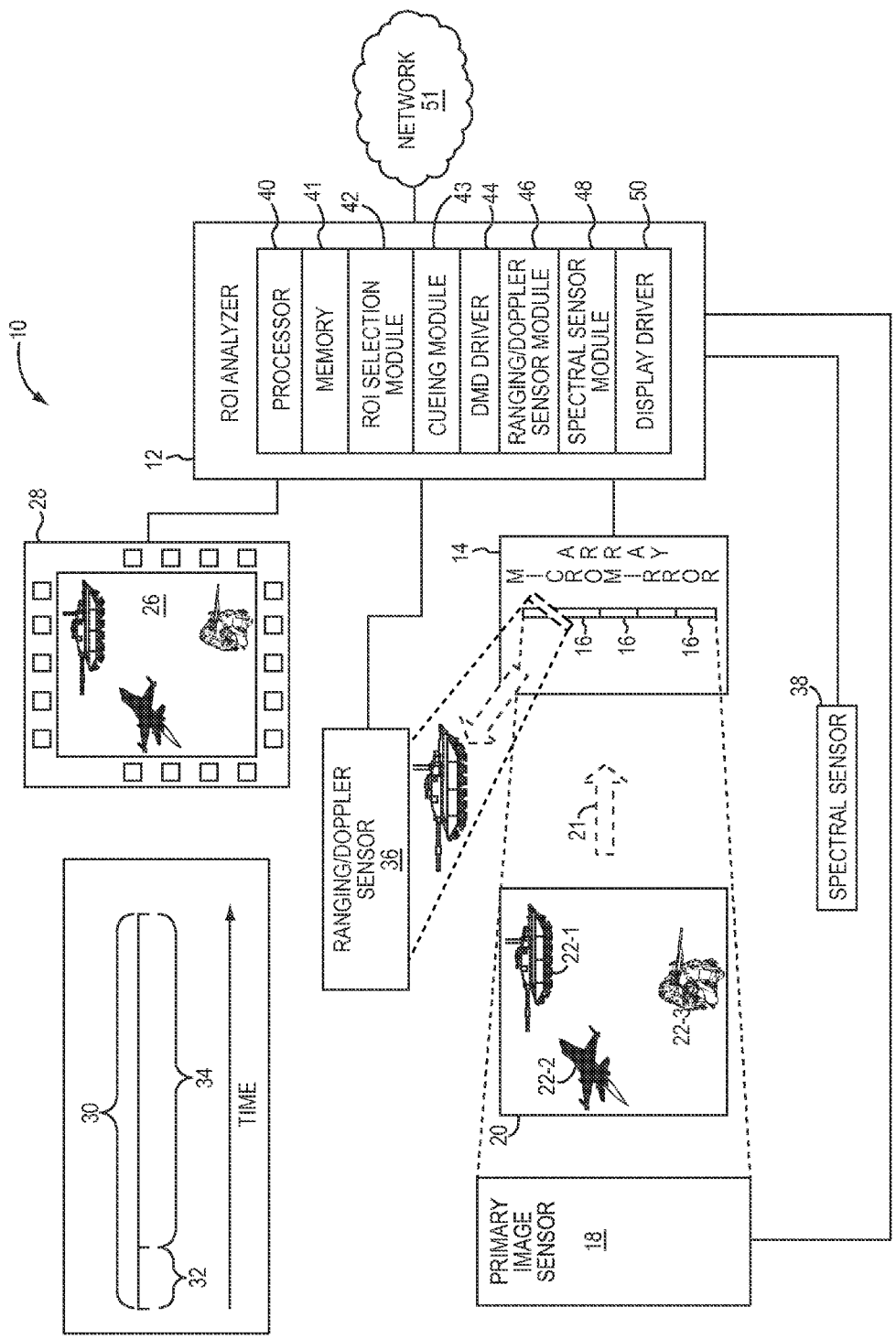
Figure 1C:
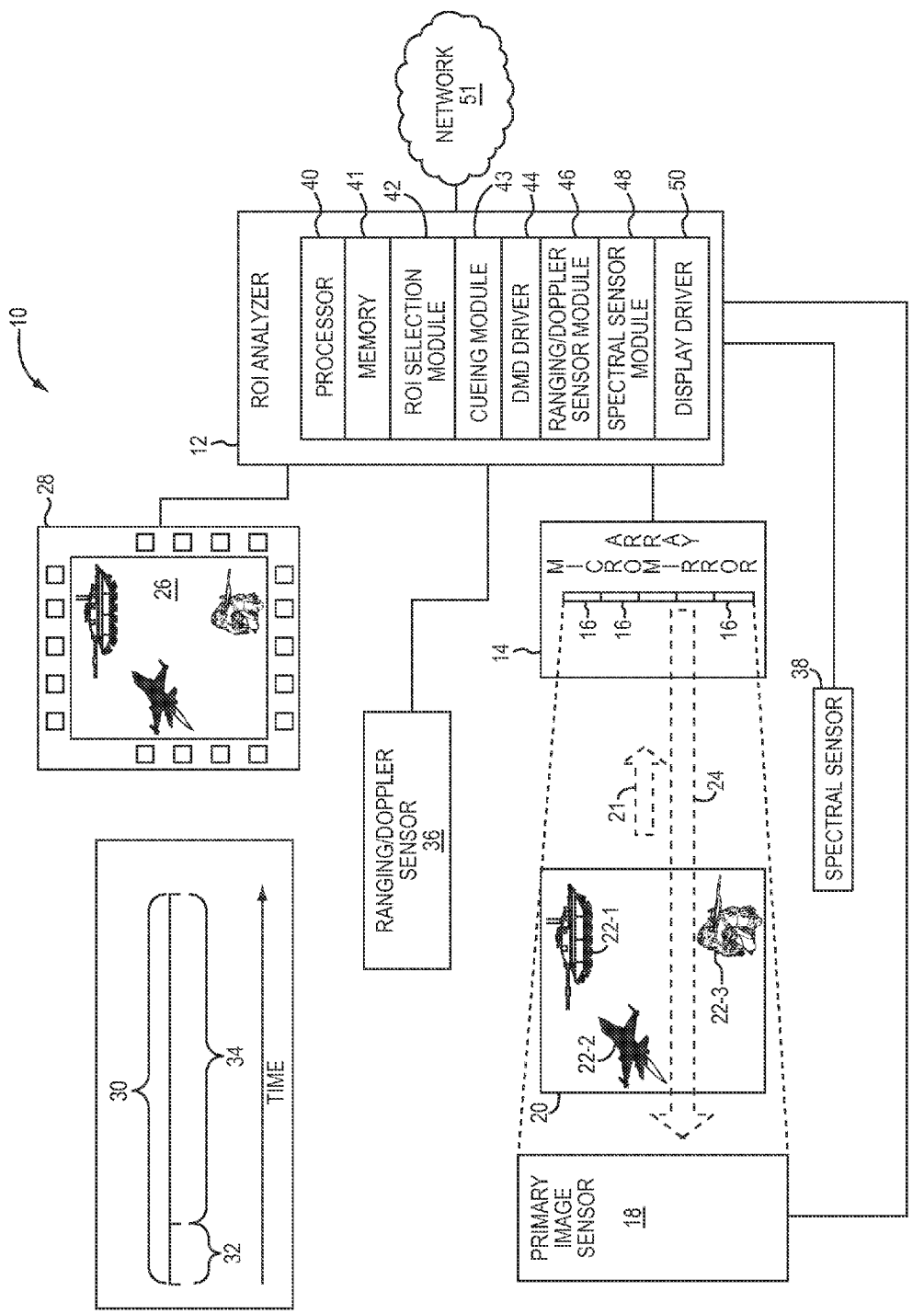

The embodiments relate to the spatial isolation of energy associated with one or more regions of interest (ROIs) in a scene. In particular, the embodiments facilitate a multiple sensor system wherein the energy associated with an ROI may be directed by a micromirror array to multiple different sensors. FIGS. 1A-1C are block diagrams of a system 10 at three successive points in time illustrating one embodiment. Referring first to FIG. 1A, the system 10 includes an ROI analyzer 12, which may comprise one device or multiple devices communicatively coupled together. The ROI analyzer 12 is communicatively coupled to a micromirror array 14. In one embodiment, the micromirror array 14 may comprise a digital micromirror device (DMD). The micromirror array 14 comprises an array of micromirrors 16. The micromirrors 16 may be separately controllable and have a plurality of different tilt modes, or different tilt positions. The micromirrors 16 may be controlled individually to be moved to one or more different tilt positions to reflect energy impinging on the respective micromirror 16 in a desired direction. The micromirrors 16 may have any number of different tilt positions. The micromirror array 14 may have any desired density, and in some embodiments, each micromirror 16 may be about 10 microns in diameter.

The system 10 may also include a primary image sensor 18 that is communicatively coupled to the ROI analyzer 12. The primary image sensor 18 may comprise any type of image sensor, such as an image sensor that operates in a visible spectrum, or a focal plane array sensor that operates in an infrared spectrum.

In operation, in one embodiment the primary image sensor 18 receives energy reflected by the micromirror array 14 from a scene 20 while the micromirrors 16 are in a primary position, as illustrated via arrows 21 and 24. The energy may comprise any one or more of spectral energy, laser range return energy, polarimetric energy, vibration energy, Doppler energy, and hyper temporal energy.

Arrow 21 represents the energy from the scene 20, and arrow 24 represents the energy reflected from the micromirror array 14 toward the primary image sensor 18. The primary image sensor 18 receives energy based on a particular field of view (FOV), which may be defined by one or more characteristics of the system 10, including, for example, the primary image sensor 18 itself, the micromirror array 14, optical elements (not illustrated), and the like. Based on the energy received from the scene 20, the primary image sensor 18 generates sensor data that quantifies the energy of the scene 20, which may be used by one or more elements of the system 10, such as for rendering imagery 26 of the scene 20 in a real-time FOV full motion video on a display 28 for viewing, for example, by a pilot. The sensor data may also be utilized, as will be discussed in greater detail herein, to identify one or more ROIs within the scene 20 for further analysis.

In one embodiment, the primary image sensor 18 has a frame period 30 that is based on a frame rate of the primary image sensor 18, which represents the rate at which the primary image sensor 18 generates frames of sensor data of the scene 20. The frame rate may be any desired frame rate, but solely for purposes of illustration, will be assumed to be 30 frames per second (FPS). At 30 FPS, the frame period 30 is about 33 milliseconds (ms). The frame period 30 can be considered as comprising both an integration period 32 and a wait period 34. The integration period 32 represents that portion of the frame period 30 during which detector elements of the primary image sensor 18 integrate the energy received from the scene 20, and the wait period 34 represents the delay between that portion of the frame period 30 during which the detector elements of the primary image sensor 18 no longer integrate the energy received from the scene 20 and the beginning of the next frame.

The particular length of time of the integration period 32 and the wait period 34 may differ depending on a number of parameters, such as the particular primary image sensor 18, types of detector elements, the particular frame rate, and the like. However, for purposes of context, the integration period 32 may comprise, for example, 8 ms-12 ms, and wait period 34 may comprise, for example, 18 ms-22 ms.

The system 10 may also include one or more additional sensors, including, for example, a ranging sensor 36 and a spectral sensor 38. The ranging sensor 36 may be positioned such that the micromirrors 16, in one tilt position, may reflect energy of the scene 20 toward the ranging sensor 36. Similarly, the spectral sensor 38 may be positioned such that the micromirrors 16, in another tilt position, may reflect energy of the scene 20 toward the spectral sensor 38. While for purposes of illustration two types of sensors are illustrated, a ranging sensor and a spectral sensor, the embodiments are not limited to such types of sensors, and have applicability to any sensor that may glean information from the energy emitted or reflected by an ROI in a scene, including, by way of non-limiting example, a Doppler sensor, a vibration sensor, a polarization sensor, or an image sensor in any desired wavelength.

In one embodiment, the ROI analyzer 12 includes at least one processor 40 and a memory 41. The ROI analyzer 12 may include certain functionality that may be implemented by one or more modules, including, for example, an ROI selection module 42 that is configured to receive sensor data from a sensor, such as the primary image sensor 18, and analyze the sensor data to identify, locate or otherwise determine one or more ROIs contained in the scene 20. Such functionality may be the same or substantially similar as that found in conventional targeting systems.

As an example, the ROI analyzer 12 may identify multiple ROIs in the scene 20, including an ROI 22-1 comprising a tank, an ROI 22-2 comprising a plane, and an ROI 22-3 comprising a sniper (generally, ROIs 22). An ROI 22 may comprise an object, such as an airplane, may comprise a static entity, such as a building or geographic feature, may comprise foliage, or any other thing or object that may be determined to be of interest based on the configuration and parameters of the ROI selection module 42. In some embodiments, an ROI 22 may include not only an object of interest, but also a portion of background scenery to provide a reference for the energy emitted or reflected by the object. Thus, in some embodiments, an ROI 22 may include only an object, such as a plane or a tank, and in other embodiments, an ROI 22 may include the object as well as an appropriate sample of background. Among other advantages, capturing local background energy associated with an object allows a comparison to be made between the energy of the background around the object and the energy of the object. The energy of a relatively small, unresolved object may be corrupted by the energy of the background that is observed in a same instantaneous FOV. Including such background energy may allow for the removal of the corrupted energy from the object to obtain a true, spatially isolated, energy signature of the phenomena associated with the object.

The ROI selection module 42, in conjunction with a cueing module 43, may identify a subset of micromirrors 16 of the micromirror array 14 that receive energy from a respective ROI 22. In one embodiment, the micromirror array 14 may have a mathematical relationship with, or otherwise be registered to, the FOV of the primary image sensor 18, such that pixel locations of the primary image sensor 18 and micromirrors 16 of the micromirror array 14 can be easily mapped to one another.

A DMD driver 44 controls the micromirror array 14, such that at any given point in time, a single micromirror 16, one or more subsets of micromirrors 16, or all micromirrors 16 can be controlled to move from a current position to a different position, and thereby direct the energy from the scene 20 to one or more desired sensors, such as the primary image sensor 18, the ranging sensor 36 and the spectral sensor 38.

A ranging module 46 implements functionality associated with the ranging sensor 36, such as an ability to determine a range, or distance, between the system 10 and a particular ROI 22. A spectral sensor module 48 implements functionality associated with the spectral sensor 38, such as an ability to analyze the spectral components of a particular ROI 22. A display driver 50 renders and provides the imagery 26 of the scene 20 to the display 28 to provide the pilot or other user with a real-time FOV full motion video. A network 51 represents other components or devices that may be coupled to the ROI analyzer 12.

While various modules and drivers of the ROI analyzer 12 are, for purposes of illustration, shown as being separate modules, it will be appreciated that the functionality described herein with respect to the ROI analyzer 12 may be implemented in any number of different modules, including a single module, depending on various design criteria. Moreover, such functionality may be implemented as programming instructions that may reside, for example, in the memory 41 and be processed by the processor 40, or may be implemented in hardware, such as via a Field-Programmable Gate Array, Application-Specific Integrated Circuit, or the like, or may be implemented via a combination of programming instructions and hardware. Functionality implemented by any particular component, module or element of the ROI analyzer 12 may be generally attributed to the ROI analyzer 12, or the processor 40, for purposes of illustration.

FIG. 1A illustrates the micromirrors 16 in a primary position, wherein the micromirrors 16 reflect energy from the scene 20 towards the primary image sensor 18. The phrase "primary position" is not intended to suggest any inherent condition of the micromirrors 16, and is used only to distinguish one possible position of the micromirrors 16 from tilt positions of the micromirrors 16, as will be discussed below.

An example of an operation of the system 10 will now be provided. Assume that over a period of time, the ROI analyzer 12 has analyzed the sensor data of the primary image sensor 18 and has identified the ROIs 22-1, 22-2, and 22-3. The ROI analyzer 12 determines that it is desirable to determine a range of the ROI 22-1 (tank). This determination may be made in conjunction with user input, such as in response to input from a pilot, or may be determined automatically. The ROI analyzer 12 identifies in the micromirror array 14 a first subset of micromirrors 16 that receive energy from the ROI 22-1. The ROI analyzer 12 waits for a current integration period 32 of a current frame period 30 to end, and during the wait period 34 of the current frame period 30 controls at least one micromirror 16 in the first subset of micromirrors 16 to move from the primary position to a first tilt position to reflect energy from the first ROI toward the ranging sensor 36.

FIG. 1B is a block diagram of the system 10 at a point in time after the at least one micromirror 16 in the first subset of micromirrors 16 has moved from the primary position to a first tilt position to reflect the energy from the ROI 22-1 toward the ranging sensor 36. While for purposes of illustration a single micromirror 16 is illustrated, the subset of micromirrors 16 may comprise any number of micromirrors 16. While the at least one micromirror 16 is in the first tilt position, all or some of the energy emitted or reflected by the ROI 22-1 is reflected by the at least one micromirror 16 toward the ranging sensor 36. The amount of time that the at least one micromirror 16 is maintained in the first tilt position may depend on a number of criteria, such as an integration period associated with the ranging sensor 36, as well as the remaining time of the integration period 32 of the current frame period 30. In some embodiments, before the beginning of the next integration period 32 of the next frame period 30, the ROI analyzer 12 controls the at least one micromirror 16 in the first subset of micromirrors 16 to move from the first tilt position back to the primary position such that the at least one micromirror 16 is positioned to reflect the energy back towards the primary image sensor 18 during the next integration period 32.

FIG. 1C is a block diagram of the system 10 at a point in time after the at least one micromirror 16 in the first subset of micromirrors 16 has been controlled to move from the first tilt position back to the primary position, and thus is in position to reflect the energy from the scene 20 toward the primary image sensor 18 during the next integration period 32. Notably, the sequence described in FIGS. 1A-1C may occur repeatedly and successively over multiple frame periods 30, until the ranging sensor 36 has sufficiently integrated energy from the ROI 22-1 to perform the desired function, or until some other criteria is met. Thus, for each frame period 30 of a plurality of successive frame periods 30 the at least one micromirror 16 in the first subset of micromirrors 16 may be controlled to move from the primary position of the at least one micromirror 16 to the first tilt position of the at least one micromirror 16 to reflect the energy of the ROI 22-1 toward the ranging sensor 36 during the wait period 34 of the each frame period 30, and then controlled to return to the primary position of the at least one micromirror 16 prior to a next frame period 30.

Figure 2B:
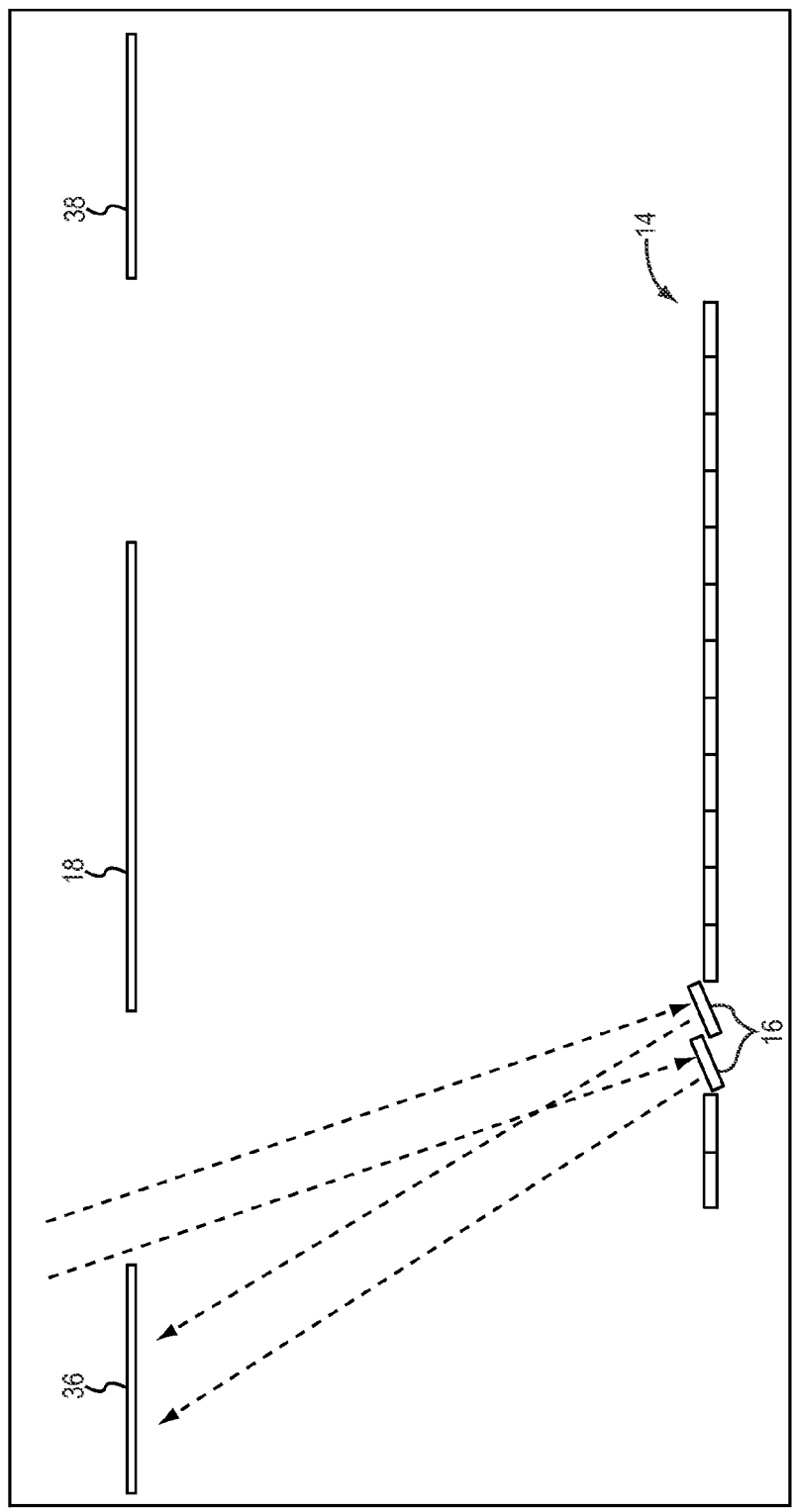
Figure 2C:
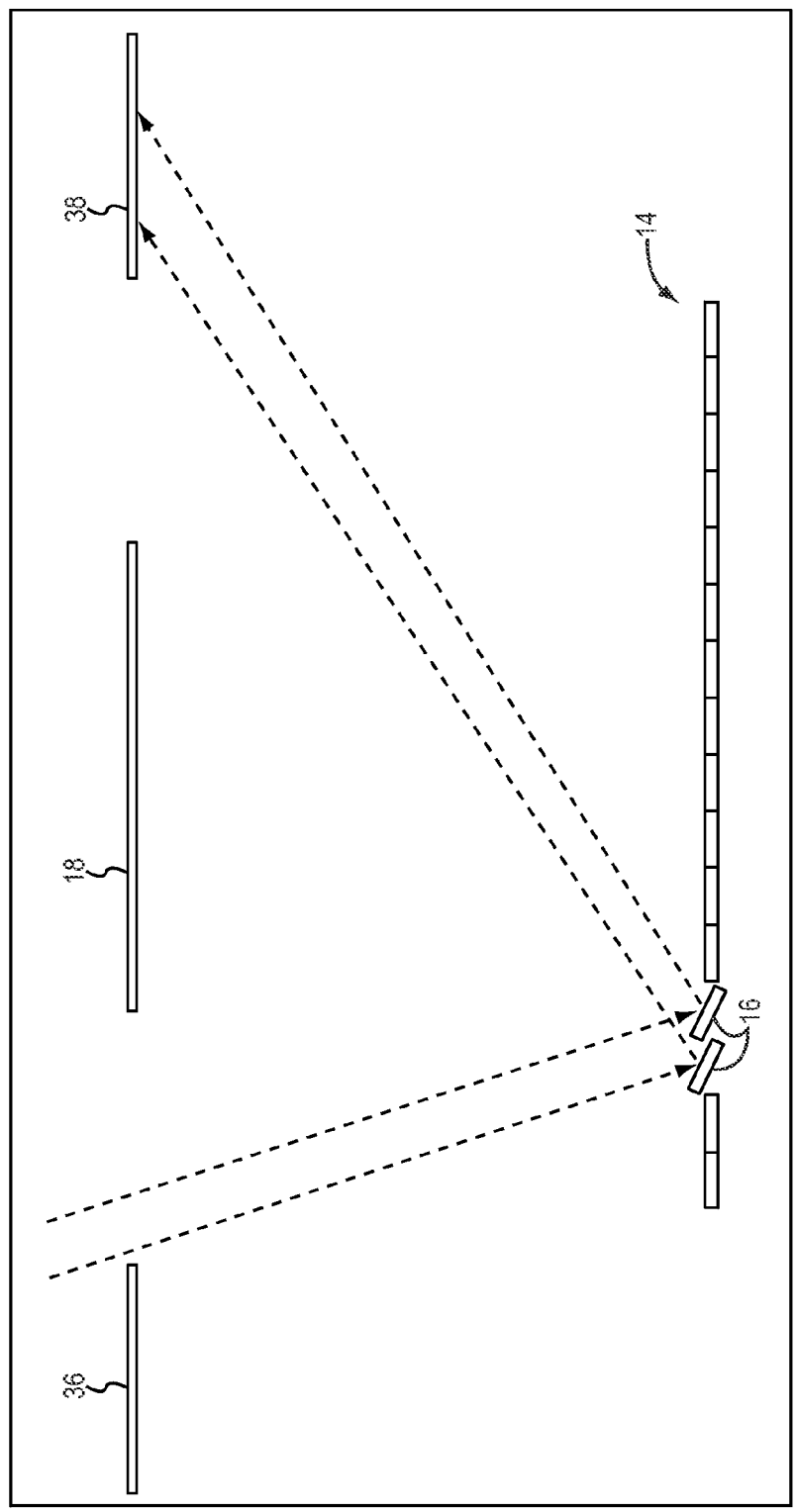

FIGS. 2A-2C are block diagrams illustrating the micromirrors 16 in various positions, according to one embodiment. FIG. 2A illustrates all the micromirrors 16 in a primary position, wherein the micromirrors 16 reflect energy toward the primary image sensor 18. FIG. 2B illustrates two micromirrors 16 that have been controlled to move from the primary position to a first tilt position to reflect a portion of the energy of the scene 20 toward the ranging sensor 36. FIG. 2C illustrates the same two micromirrors 16 after they have been controlled to move to a second tilt position to reflect the portion of the energy of the scene 20 toward the spectral sensor 38.

Figure 3:
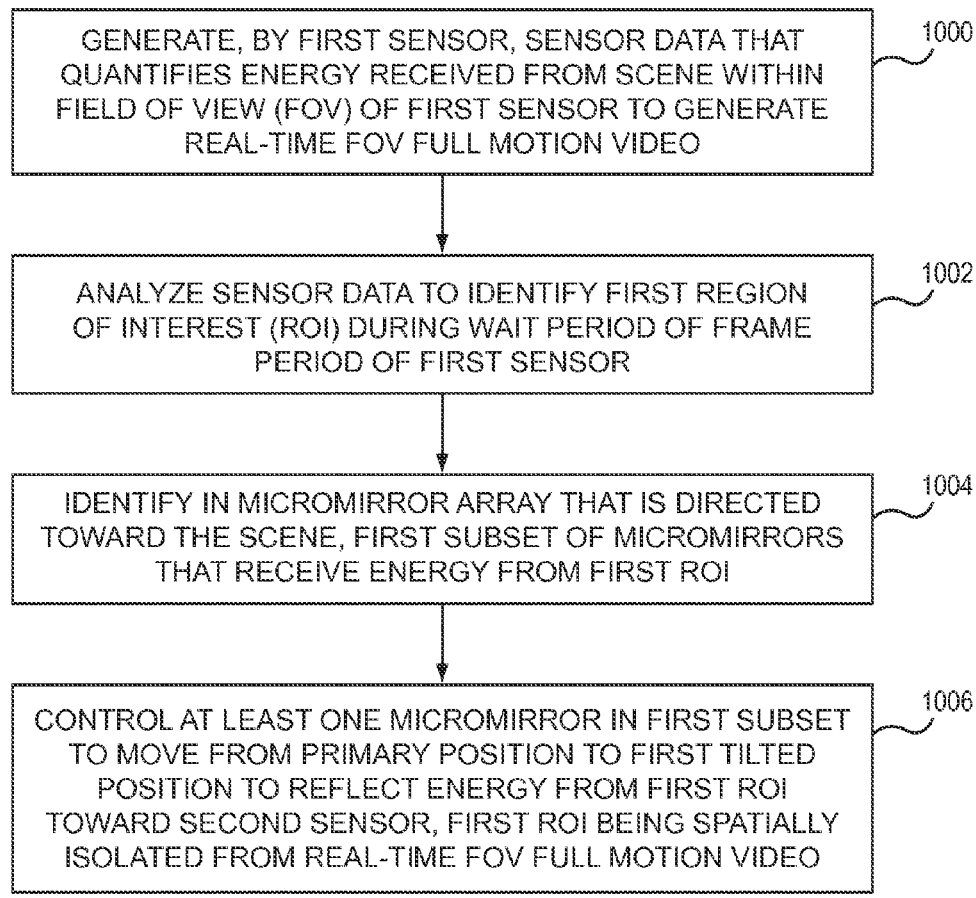
FIG. 3 is a flowchart of a process for causing energy associated with a region of interest (ROI) to be reflected to a sensor, according to one embodiment.

FIG. 3 is a flowchart of a process for causing energy associated with an ROI 22 to be reflected to a sensor according to one embodiment. FIG. 3 will be discussed in conjunction with FIGS. 1A-1C. The process begins with a first sensor, such as the primary image sensor 18, generating sensor data that quantifies energy received from the scene 20 within the FOV of the primary image sensor 18 to generate real-time FOV full motion video (FIG. 3, block 1000). A processor, such as the processor 40, analyzes the sensor data to identify a first ROI 22 (FIG. 3, block 1002). A first subset of the plurality of micromirrors 16 is identified in the micromirror array 14 that include energy from the first ROI 22 during a wait period of a frame period of the first sensor (FIG. 3, block 1004). At least one micromirror 16 in the first subset is controlled to move from a primary position of the at least one micromirror 16 to a first tilt position of the at least one micromirror 16 to reflect the energy from the first ROI 22 toward a second sensor, such as the ranging sensor 36 or the spectral sensor 38, to spatially isolate the first ROI from the real-time FOV full motion video (FIG. 3, block 1006). In one context, the subset of micromirrors 16 that receive energy from the first ROI 22 operate as a "spatial mask" that is used to reflect the energy from the first ROI 22 to a particular sensor, and effectively mask other non-reflected energy of the scene 20 from the particular sensor.

Figure 4:
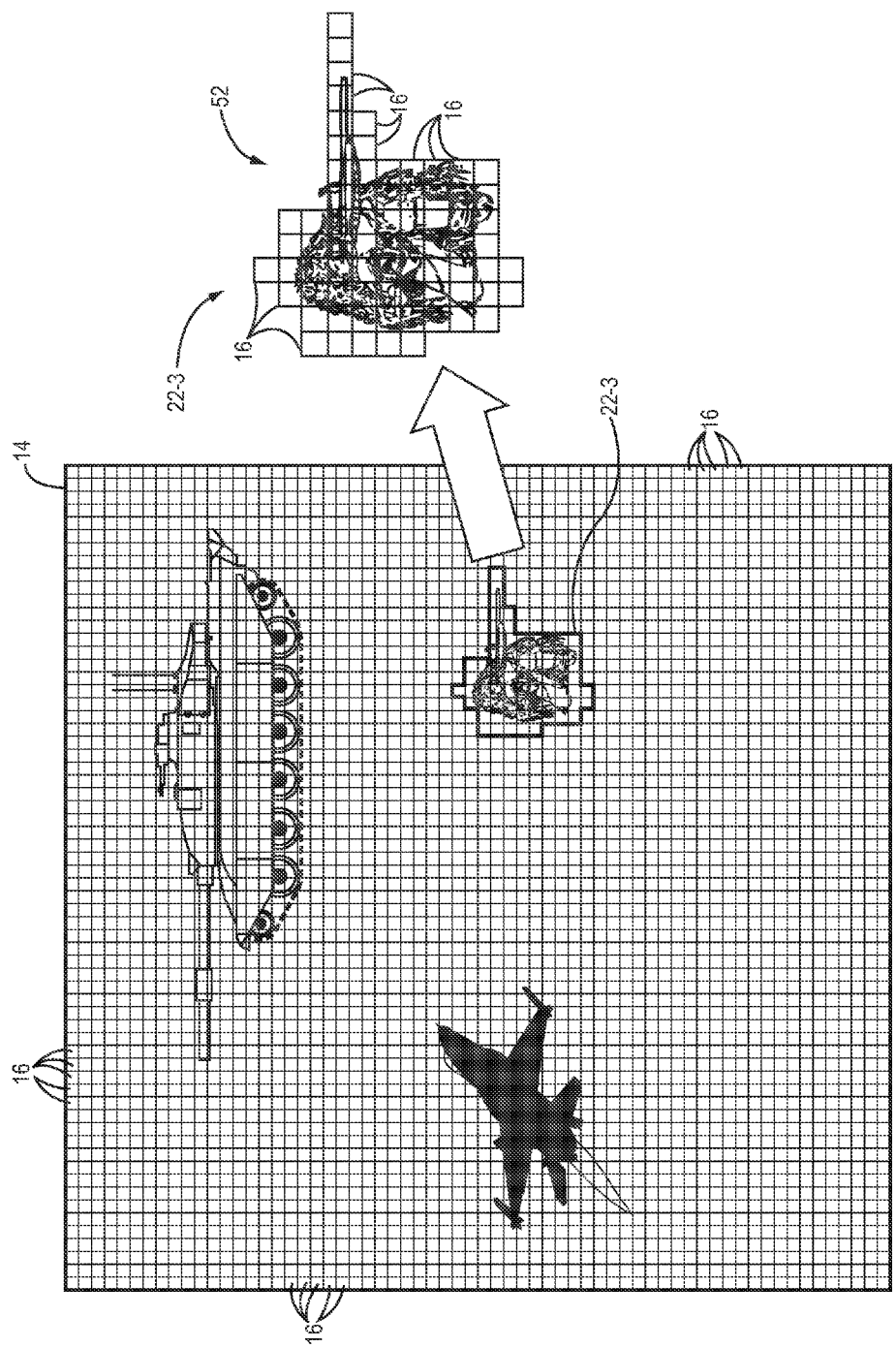
FIG. 4 is a block diagram illustrating a micromirror array in greater detail.

FIG. 4 is a block diagram illustrating the micromirror array 14 in greater detail. The micromirror array 14 has a certain resolution based on the number of micromirrors 16. FIG. 4 illustrates a subset 52 of the micromirrors 16 that receive energy from the ROI 22-3. The micromirrors 16 may include some micromirrors 16 that receive the energy of an object within the ROI 22-3, such as a sniper, and may also include micromirrors 16 that receive some background energy adjacent to the object. The receipt of energy of both an object of interest and adjacent background allows a comparison to be made between the energy of the background around the object and the energy of the object. During the wait period 34 of the frame period 30, all the micromirrors 16 within the subset 52 may be moved from a primary position of the respective micromirrors 16 to first tilt positions of the micromirrors 16 to reflect the energy from the ROI 22-3 toward a second sensor.

Figure 5:
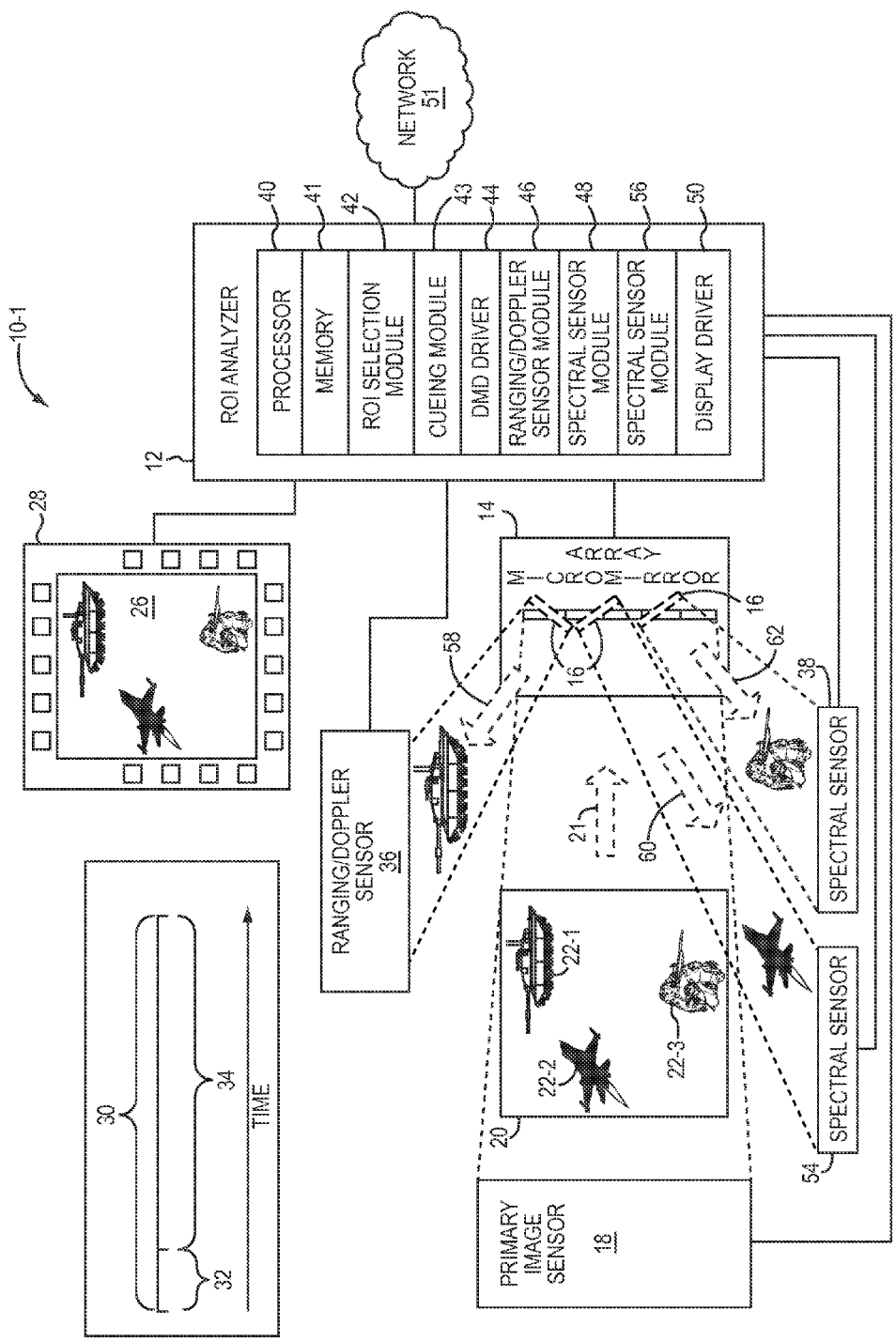
FIG. 5 is a block diagram of a system, according to another embodiment.

FIG. 5 is a block diagram of a system 10-1 according to another embodiment. The system 10-1 is substantially similar to the system 10 previously illustrated, except the system 10-1 includes an additional spectral sensor 54 and a corresponding spectral sensor module 56 that implements functionality associated with the spectral sensor 54, such as an ability to analyze the spectral content of an ROI 22 reflected upon the spectral sensor 54. In this embodiment, the ROI analyzer 12 analyzes the sensor data from the primary image sensor 18 to identify additional ROIs 22 within the scene 20. Assume that the ROI analyzer 12 identifies the ROIs 22-2, 22-3 in the scene 20. The ROI analyzer 12 then identifies a second subset of the plurality of micromirrors 16 that receive energy from the ROI 22-2, and identifies a third subset of the plurality of micromirrors 16 that receive energy from the ROI 22-3. During the wait period 34 of the frame period 30, the ROI analyzer 12 controls, substantially concurrently, at least one micromirror 16 in a first subset of micromirrors 16 to move from a primary position to a tilt position to reflect energy 58 of the ROI 22-1 toward the ranging sensor 36, at least one micromirror 16 in the second subset of micromirrors 16 to move from a primary position to a tilt position to reflect energy 60 of the ROI 22-2 toward the spectral sensor 54, and at least one micromirror 16 in the third subset of micromirrors 16 to move from a primary position to a tilt position to reflect energy 62 of the ROI 22-3 toward the spectral sensor 38. The ROI analyzer 12 may then control each of the three subsets of micromirrors 16 to move from the respective tilt positions to the respective primary positions prior to the end of the wait period 34, such that the three subsets of micromirrors 16 reflect the energy from the scene 20 toward the primary image sensor 18 during the integration period 32 of the next frame period 30.

Figure 6A:
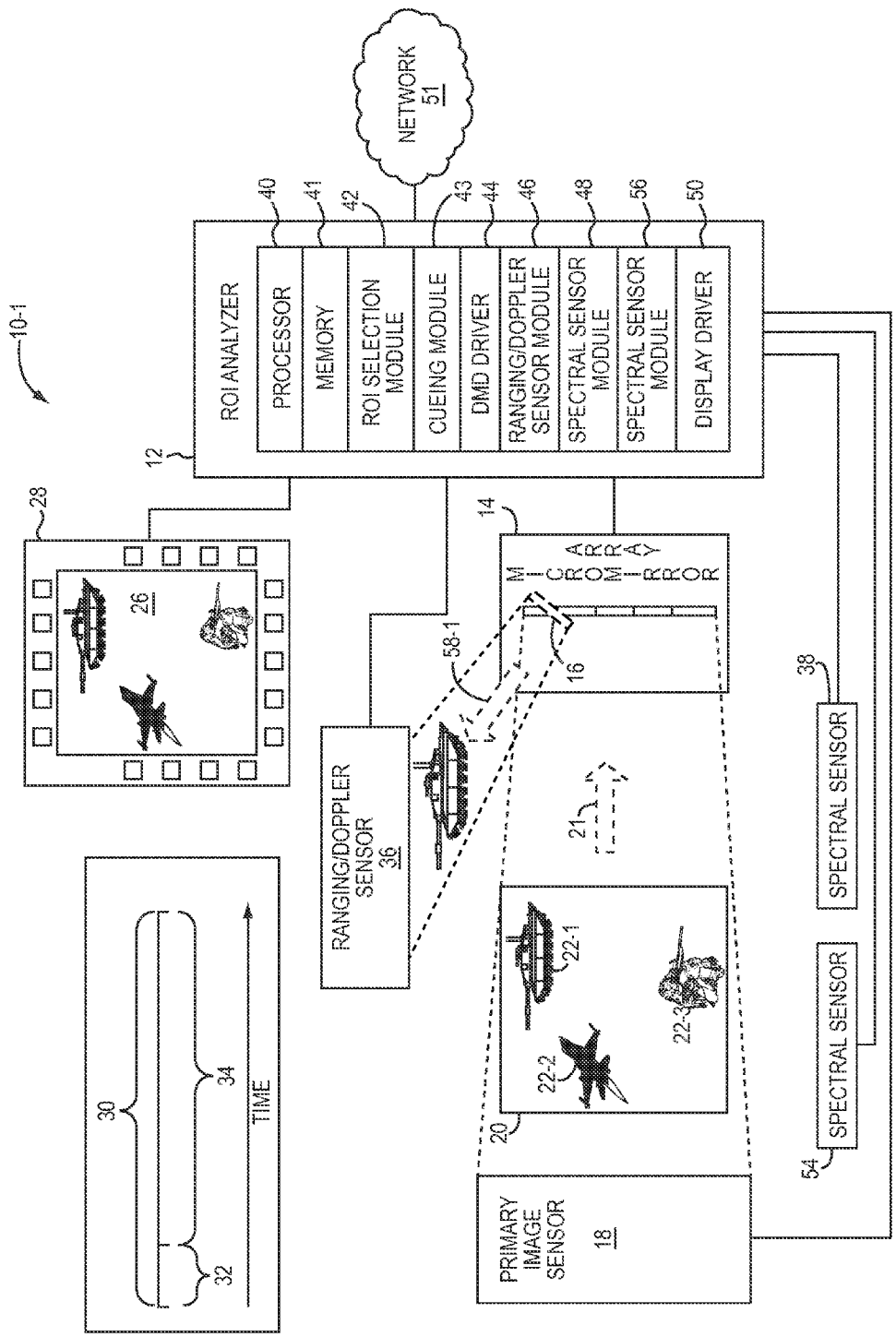
FIGS. 6A and 6B are block diagrams of the system illustrated in FIG. 5 operating in a different mode, according to one embodiment.
Figure 6B:
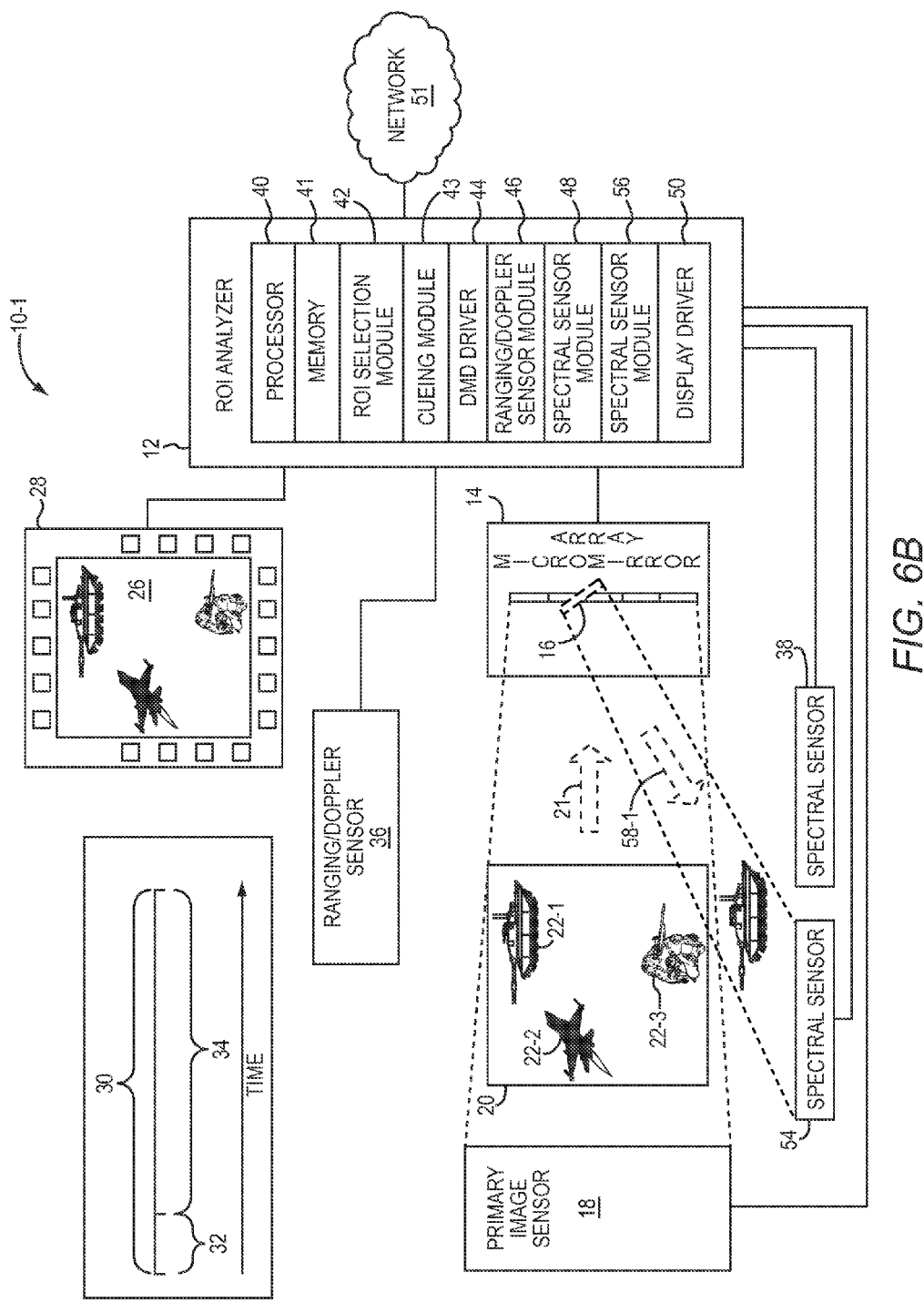

FIGS. 6A and 6B are block diagrams of the system 10-1 operating in a different mode, according to one embodiment. In this mode, the micromirrors 16 in a subset of micromirrors 16 may be controlled to reflect energy from the same ROI 22 to different sensors over a period of time. FIG. 6A illustrates at least one micromirror 16 in a subset of micromirrors 16 being controlled to move from a primary position of the micromirror 16 to a first tilt position to reflect energy 58-1 emitted or reflected by the ROI 22-1 toward the ranging sensor 36. FIG. 6B, at a subsequent point in time, illustrates the at least one micromirror 16 in the same subset of micromirrors 16 being controlled to move to a respective second tilt position to reflect the energy 58-1 emitted or reflected by the ROI 22-1 toward the spectral sensor 54. The energy 58-1 may be alternately sent to both the ranging sensor 36 and the spectral sensor 54 during a same wait period 34 of the frame period 30, or may be sent during different wait periods 34 of different frame periods 30.

Figure 7A:
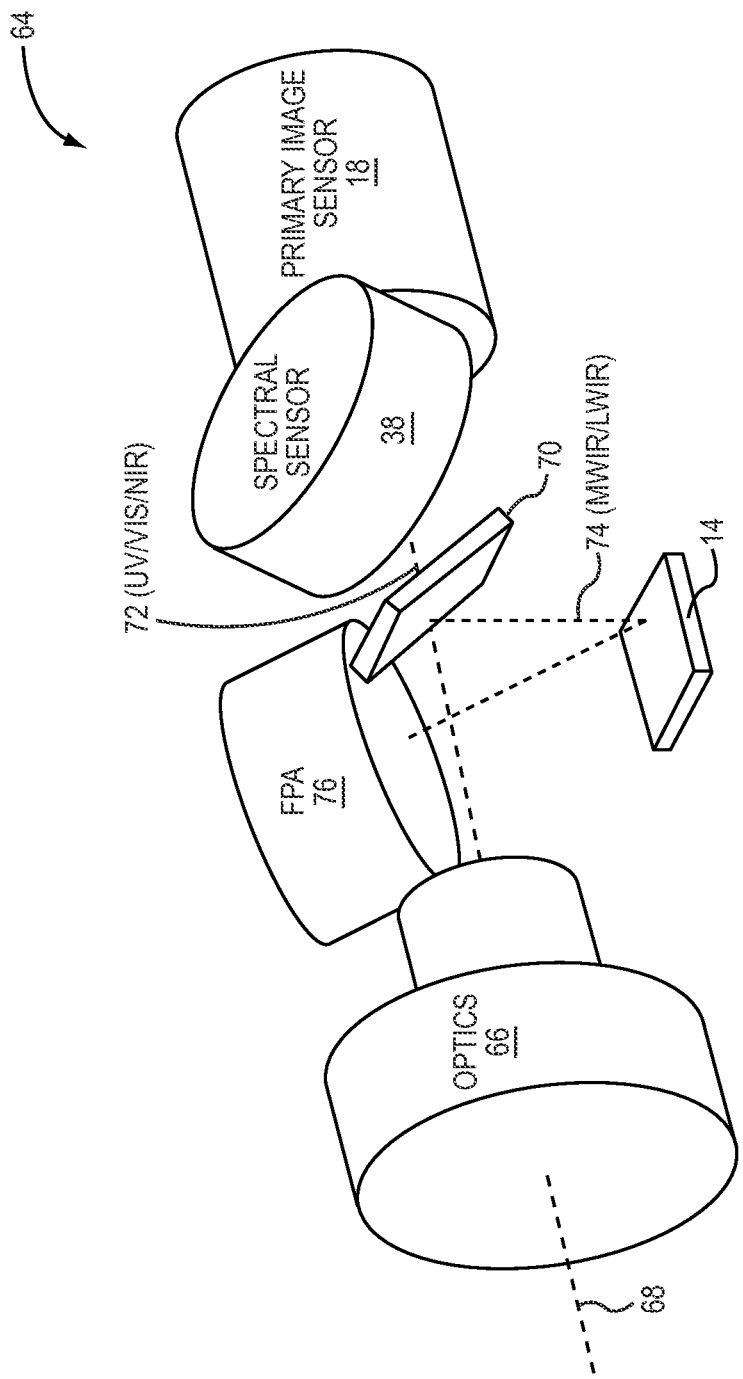
FIGS. 7A and 7B are block diagrams of a perspective view of an arrangement of components in a system, according to one embodiment, shown at two different times.
Figure 7B:
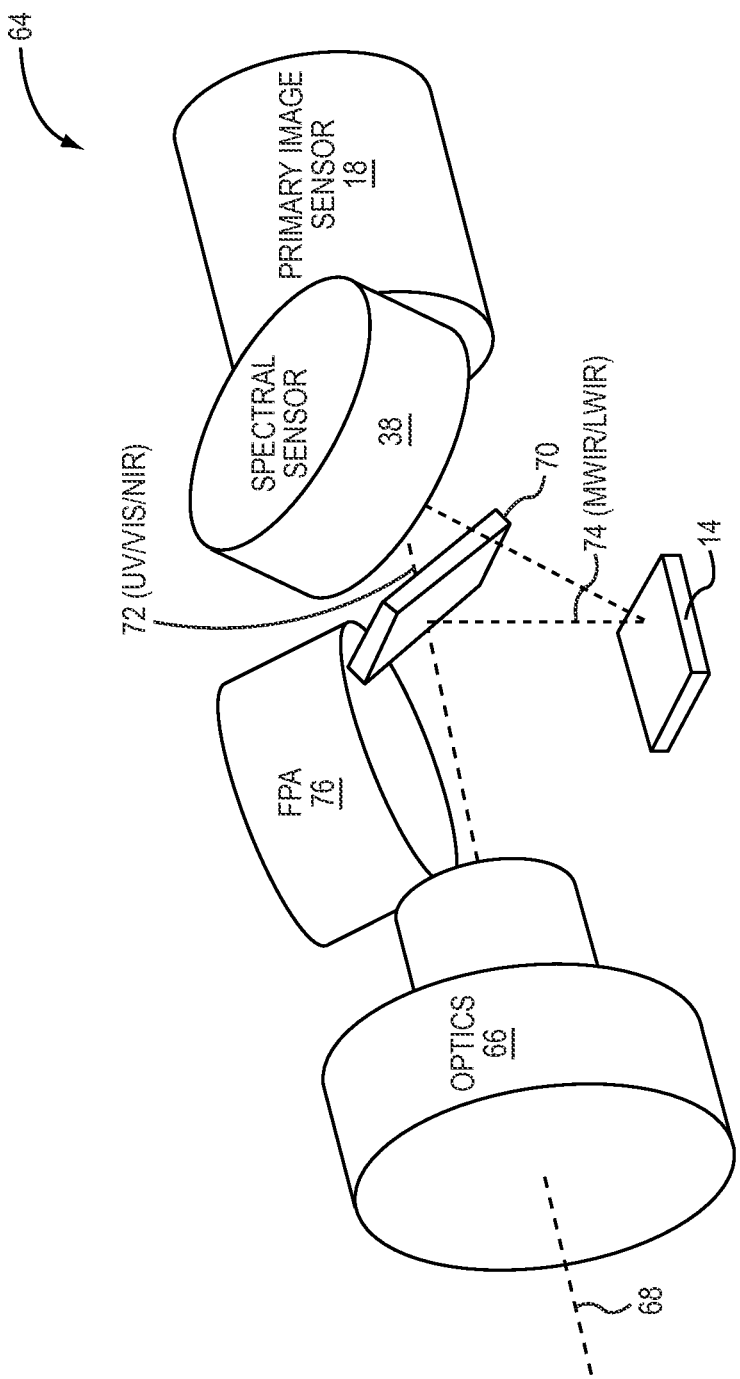

For purposes of illustration, the systems 10, 10-1 are illustrated in two-dimensional block format. It will be appreciated that the various components discussed herein may in practice be implemented in any number of different configurations that could effectively focus or otherwise direct energy from a scene onto the micromirror array 14, and from there, be reflected onto any number of different sensors. For ease of illustration, conventional components, such as lenses, beam splitters, and other optical elements have been omitted from the drawings. FIGS. 7A and 7B are block diagrams of a perspective view of an arrangement of components in a system 64, according to one embodiment, shown at two different times. In this embodiment, one or more lenses 66 and/or other optical components direct energy 68 from a scene (not illustrated) toward a beamsplitter 70. By way of non-limiting example, the beamsplitter 70 may split ultraviolet/visible/near-infrared (UV/VIS/NIR) energy 72 of the energy 68 from mid-wave/long-wave infrared (MWIR/LWIR) energy 74 of the energy 68. The UV/VIS/NIR energy 72 is passed through the beamsplitter 70 towards the primary image sensor 18. The MWIR/LWIR energy 74 is reflected toward the micromirror array 14. Micromirrors 16 (not illustrated) in the micromirror array 14 reflect the MWIR/LWIR energy 74 toward a focal plane array (FPA) 76 during an integration period of a frame period of the FPA 76. An ROI 22 may be identified based on the sensor data generated by the FPA 76. FIG. 7B illustrates the system 64 during the wait period of the frame period. During the wait period, infrared energy associated with the identified ROI 22 is reflected by at least one micromirror 16 toward the spectral sensor 38.

Figure 8:
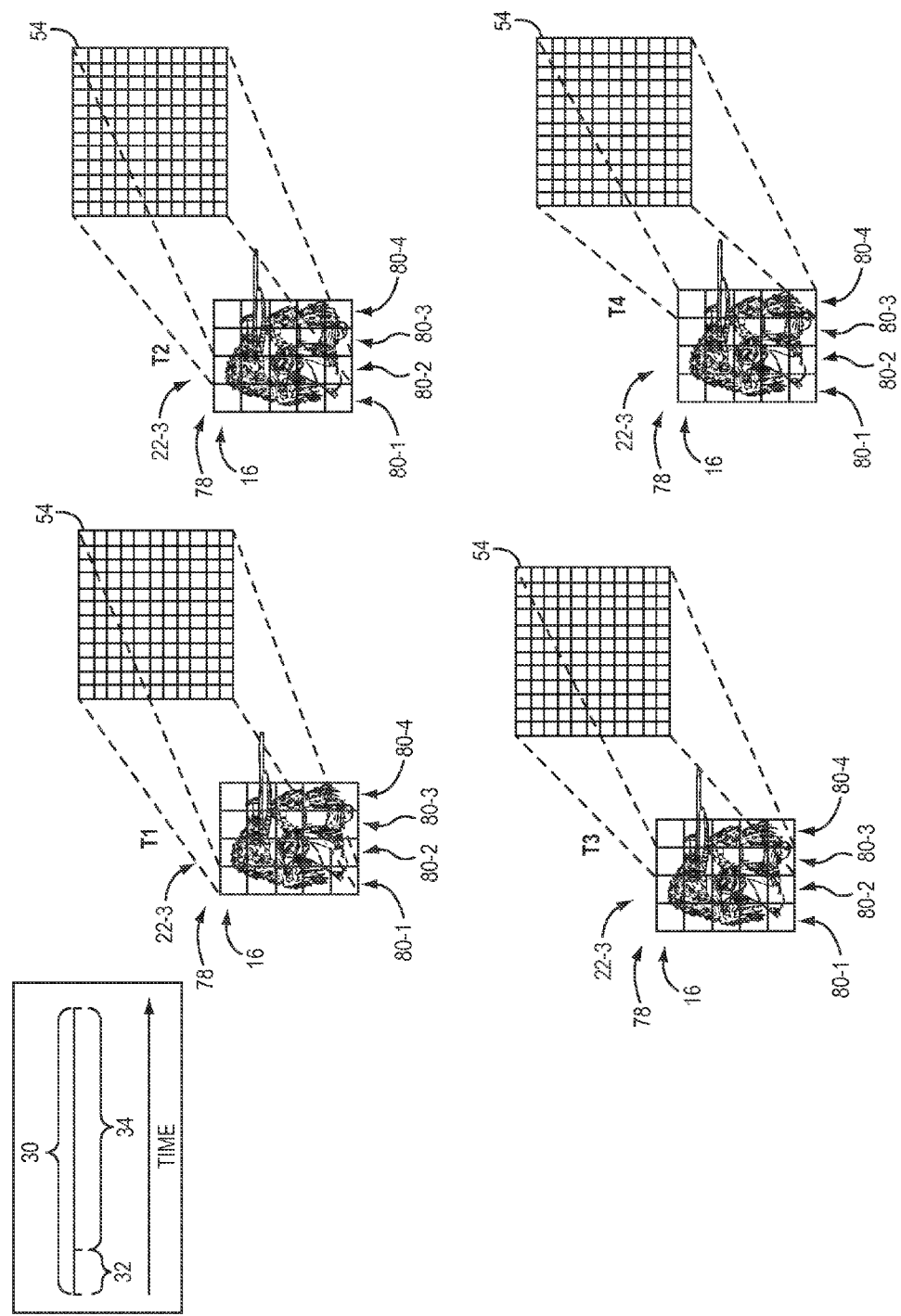
FIG. 8 is a block diagram illustrating a micromirror-controlling mode, according to one embodiment.

FIG. 8 is a block diagram illustrating a column-based controlling mode according to one embodiment. In this embodiment, a subset 78 of micromirrors 16 that receive energy from the ROI 22-3 are, successively, column-by-column, controlled to move to tilt positions to reflect energy from the ROI 22-3 toward a sensor, such as the spectral sensor 54. At a time T1, a column 80-1 of micromirrors 16 of the subset 78 are controlled to move from a primary position to a tilt position to reflect the energy from the ROI 22-3 toward the spectral sensor 54. At a time T2, the column 80-1 of micromirrors 16 are controlled to move back to their former respective primary positions, and a column 80-2 of micromirrors 16 are controlled to move to their respective tilt positions to reflect the energy from the ROI 22-3 toward the spectral sensor 54. At a time T3, the column 80-2 of micromirrors 16 are controlled to move back to their former respective primary positions, and a column 80-3 of micromirrors 16 are controlled to move to their respective tilt positions to reflect the energy from the ROI 22-3 toward the spectral sensor 54. At a time T4, the column 80-3 of micromirrors 16 are controlled to move back to their former respective primary positions, and a column 80-4 of micromirrors 16 are controlled to move to their respective tilt positions to reflect the energy from the ROI 22-3 toward the spectral sensor 54.

While only four columns 80 of micromirrors 16 are illustrated, it will be apparent that an ROI 22 might comprise any number of columns 80. In one embodiment, all of the columns 80-1-80-4 of micromirrors 16 may be controlled in this manner during the same wait period 34 of the frame period 30 if the wait period 34 is sufficiently long and the number of columns 80 of micromirrors 16 is sufficiently small. In other embodiments, each column 80 of micromirrors 16 may be controlled to reflect energy from the ROI 22 in successive frame periods 30, or each column 80 of micromirrors 16 may be repeatedly controlled to move to respective tilt positions to reflect energy toward the spectral sensor 54 successively, frame by frame, until such time as the spectral sensor 54 has integrated sufficient energy from the respective column 80 of micromirrors 16, after which time the next column 80 of micromirrors 16 may be repeatedly controlled to move to respective tilt positions to reflect energy toward the spectral sensor 54 successively, frame by frame. In operation, the columns 80 operate as "slits" often used in a spectrograph to introduce selected energy to the spectrograph while eliminating unwanted energy.

Figure 9:
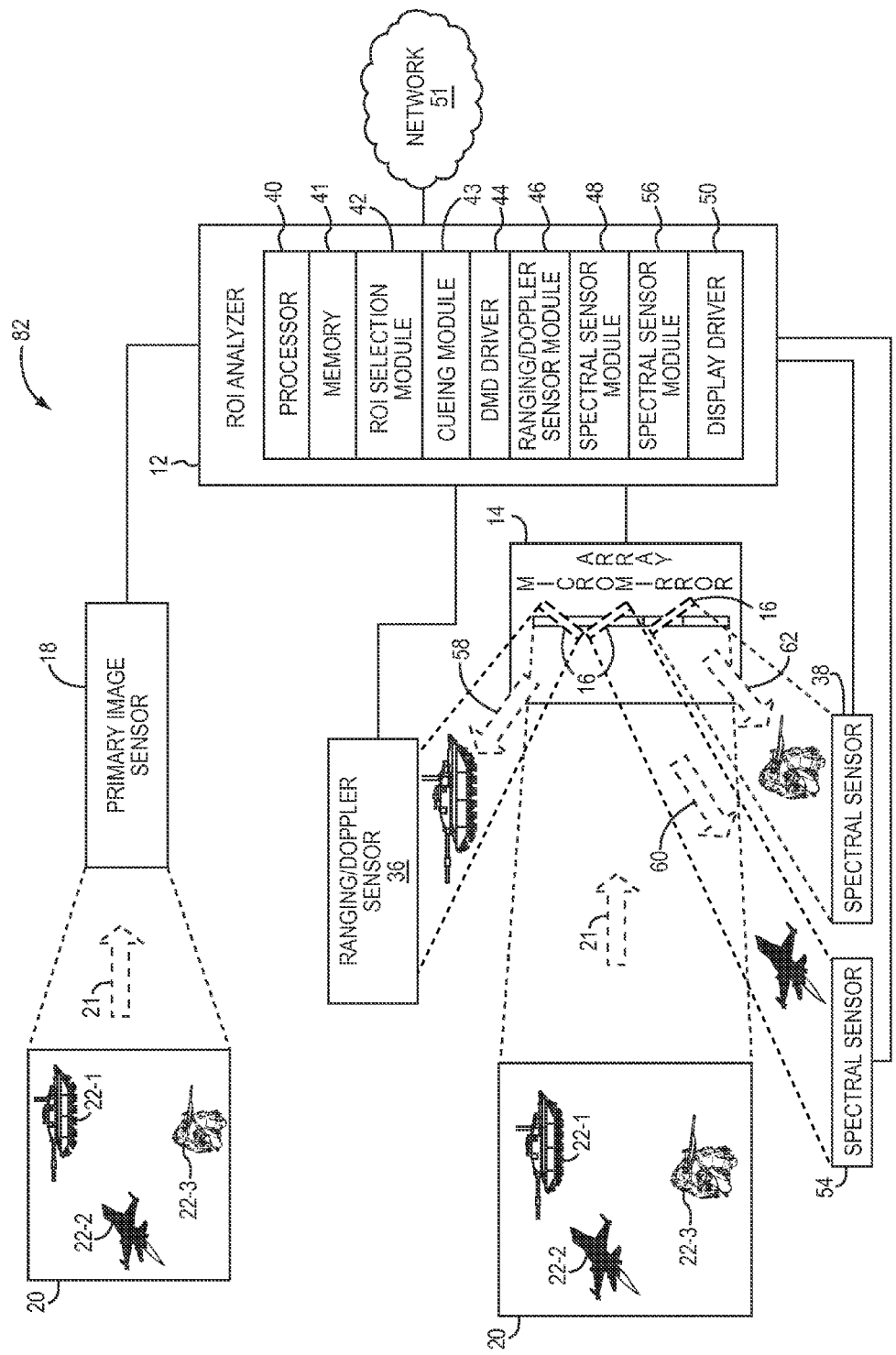
FIG. 9 is a block diagram of a system, according to another embodiment.

FIG. 9 is a block diagram of a system 82 according to another embodiment. The system 82 is substantially similar to the system 10-1 illustrated above, but in this embodiment the primary image sensor 18 receives the energy from the scene 20 independent of the micromirror array 14. The primary image sensor 18 and the micromirror array 14 are co-aligned with the scene 20, such that the micromirror array 14 is registered with the primary image sensor 18 and individual micromirrors 16 can be correlated to individual detector elements of the primary image sensor 18 to facilitate the identification and controlling of subsets of micromirrors 16 that receive energy from an ROI 22 detected by the primary image sensor 18. In this embodiment, it is not necessary to control the micromirrors 16 during wait periods 34 of the primary image sensor 18, because the primary image sensor 18 is optically independent of the micromirrors 16. Thus, the micromirrors 16 can be controlled to reflect energy to various sensors independent of the state of the primary image sensor 18. Thus, this embodiment may provide more flexibility than previously discussed embodiments, but may require additional optical elements, and have a greater cost associated therewith.

Figure 10:
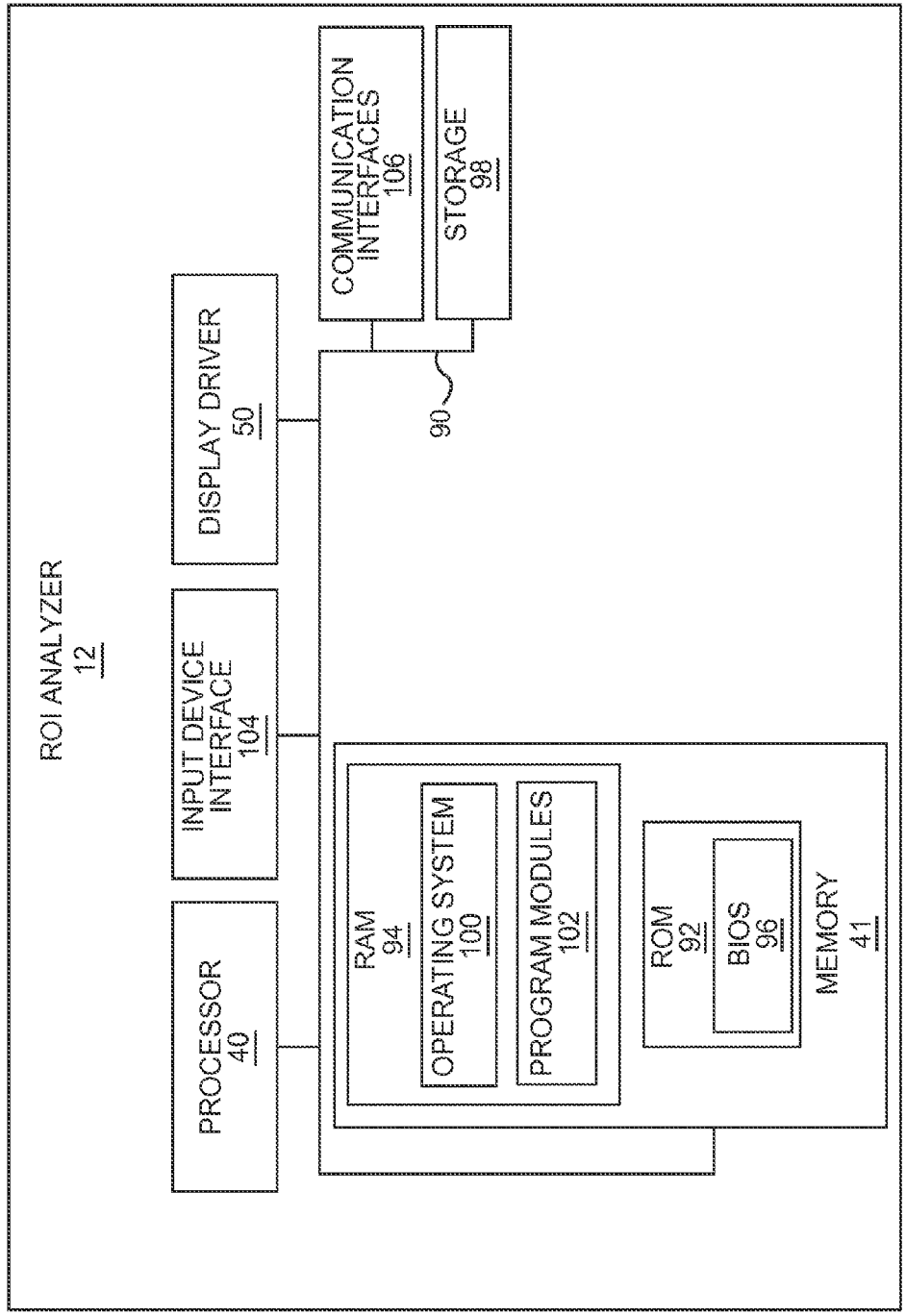
FIG. 10 is a block diagram of an ROI analyzer, according to one embodiment.

FIG. 10 is a block diagram of the ROI analyzer 12 according to one embodiment. The ROI analyzer 12 may comprise any computing or processing device, or multiple such devices communicatively coupled to one another, that are capable of including firmware, hardware, and/or executing software instructions to implement the functionality described herein. The ROI analyzer 12 includes a central processing unit such as the processor 40, a system memory, such as the memory 41, and a communication bus 90. The communication bus 90 provides an interface for components including, but not limited to, the memory 41 and the processor 40. The processor 40 can be any commercially available or proprietary processor, or the functionality described herein may be performed with multiple processors that are communicatively coupled to one another.

The communication bus 90 may be any of several types of bus structures that may further interconnect to a memory bus (with or without a memory controller), a peripheral bus, and/or a local bus using any of a variety of commercially available or proprietary bus architectures. The memory 41 may include non-volatile memory 92 (e.g., read only memory (ROM), erasable programmable read only memory (EPROM), electrically erasable programmable read only memory (EEPROM), etc.) and/or volatile memory, such as random access memory (RAM) 94. A basic input/output system (BIOS) 96 may be stored in the non-volatile memory 92, and can include the basic routines that help to transfer information between elements within the ROI analyzer 12. The RAM 94 may also include a high-speed RAM, such as static RAM for caching data.

The ROI analyzer 12 may further include or be coupled to a computer-readable storage 98, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The computer-readable storage 98 and other drives, associated with computer-readable media and computer-usable media, may provide non-volatile storage of data, data structures, computer-executable instructions, and the like. Although the description of computer-readable media above refers to an HDD, it should be appreciated by those skilled in the art that other types of media which are readable by a computer, such as Zip disks, magnetic cassettes, flash memory cards, cartridges, and the like, may also be used in an exemplary operating environment, and further, that any such media may contain computer-executable instructions for performing novel methods of the disclosed architecture.

A number of modules can be stored in the computer-readable storage 98 and in the RAM 94, including an operating system 100 and one or more program modules 102, which may implement the functionality described herein in whole or in part, including, for example, functionality associated with the ROI selection module 42, the cueing module 43, the DMD driver 44, and the like. It is to be appreciated that the embodiments can be implemented with a commercially available or a proprietary operating system 100, or combinations of operating systems 100.

All or a portion of the embodiments may be implemented as a computer program product stored on a transitory or non-transitory computer-usable or computer-readable storage medium, such as the computer-readable storage 98, which includes complex programming instructions, such as complex computer-readable program code, configured to cause the processor 40 to carry out the steps described herein. Thus, the computer-readable program code can comprise software instructions for implementing the functionality of the embodiments described herein when executed on the processor 40. The processor 40, in conjunction with the program modules 102 in the RAM 94, may serve as a controller for the ROI analyzer 12 that is configured to, or adapted to, implement the functionality described herein.

A user, such as a pilot or co-pilot, may interact with the ROI analyzer 12 via, by way of non-limiting example, one or more input devices, such as dials, buttons, a keyboard, a pointing device, such as a mouse, or a touch-sensitive surface (not illustrated). Such input devices may be connected to the processor 40 through an input device interface 104. The ROI analyzer 12 may also include one or more communication interfaces 106 that are configured to communicate with the various sensors, such as the primary image sensor 18, the spectral sensors 38, 54, the ranging sensor 36, and the like.

While the embodiments have been described for purposes of illustration in a variety of contexts, the embodiments are not so limited and have wide applicability to any number of different stationary and/or mobile applications, including the use thereof in ground vehicles, drones, unmanned aerial vehicles, and other aircraft. The embodiments allow for full motion video processing of the primary image sensor 18 while concurrently implementing multi-phenomenology sensor capability, such as range sensing, spectral sensing, polarization sensing, and the like. While for purposes of illustration only certain types of sensors have been described herein, the embodiments can be utilized with any type of sensor capable of receiving and processing energy of any type.

In some embodiments, mission tailorable spectral filters may be pre-loaded via firmware based on criteria associated with a particular mission, such as potential targets of interest, and the like. In some embodiments, the spatial isolation reduces full image hyper-cube processing burdens.

Those skilled in the art will recognize improvements and modifications to the preferred embodiments of the present disclosure. All such improvements and modifications are considered within the scope of the concepts disclosed herein and the claims that follow.

What is claimed is:
1. A method, comprising:
generating, by a first sensor, sensor data that quantifies energy received from a scene within a field of view (FOV) of the first sensor to generate an image;
analyzing, by a processor, the sensor data to identify a first region of interest (ROI);
identifying, in a micromirror array comprising a plurality of micromirrors that is directed toward the scene, during a wait period of a frame period of the first sensor, the frame period comprising an integration period and the wait period, a first subset of the plurality of micromirrors that receive energy from the first ROI; and
controlling at least one micromirror in the first subset to move from a primary position of the at least one micromirror to a first tilt position of the at least one micromirror to reflect the energy from the first ROI toward a second sensor, the first ROI being spatially isolated from the image,
wherein the first sensor generates new sensor data during each frame period of a plurality of frame periods to generate a plurality of images, the each frame period comprising the integration period and the wait period, wherein controlling the at least one micromirror further comprises:
controlling the at least one micromirror in the first subset to move from the primary position of the at least one micromirror to the first tilt position of the at least one micromirror to reflect the energy toward the second sensor during the wait period of a first frame period.

2. The method of claim 1, further comprising controlling the at least one micromirror to return to the primary position of the at least one micromirror prior to a next frame period that immediately follows the first frame period.

3. The method of claim 2, further comprising:
iteratively, for each frame period of a plurality of successive frame periods:
controlling the at least one micromirror in the subset of micromirrors to move from the primary position of the at least one micromirror to the first tilt position of the at least one micromirror to reflect the energy toward the second sensor during the wait period of the each frame period; and
controlling the at least one micromirror to return to the primary position of the at least one micromirror prior to the next frame period.

4. The method of claim 1, further comprising:
analyzing, by the processor, the sensor data to identify a second ROI;
identifying, in the micromirror array, a second subset of the plurality of micromirrors that receive energy from the second ROI, the second subset comprising a different subset from the first subset; and
controlling at least one micromirror in the second subset to move from a primary position of the at least one micromirror in the second subset to a first tilt position of the at least one micromirror in the second subset to reflect the energy from the second ROI toward a third sensor.

5. The method of claim 1, wherein the first sensor comprises an image sensor, and the second sensor comprises one of a spectral sensor, a ranging sensor, a Doppler sensor, a polarization sensor, and a vibration sensor.

6. The method of claim 1, wherein the first sensor comprises an image sensor configured to detect electromagnetic radiation in a visible spectrum, and the second sensor comprises a focal plane array configured to detect the electromagnetic radiation in an infrared spectrum.

7. The method of claim 1, wherein the first subset of the plurality of micromirrors comprises a plurality of columns of micromirrors, and wherein controlling the at least one micromirror in the first subset to move from the primary position of the at least one micromirror to the first tilt position of the at least one micromirror to reflect the energy from the first ROI toward the second sensor further comprises:
for each column of micromirrors of the plurality of columns of micromirrors, successively:
controlling only the micromirrors in the each column of micromirrors to concurrently move from the respective primary positions of the micromirrors in the each column to the respective first tilt positions of the micromirrors in the each column to reflect the energy from the first ROI toward the second sensor.

8. The method of claim 7, wherein the first sensor generates new sensor data during each frame period of a plurality of frame periods, each frame period comprising an integration period and the wait period, wherein the plurality of columns of micromirrors are successively controlled to concurrently move from the respective primary positions of the micromirrors to the respective first tilt positions of the micromirrors in the each column to reflect the energy from the first ROI toward the second sensor during a same wait period of a first frame period.

9. The method of claim 7, wherein the first sensor generates new sensor data during each frame period of a plurality of frame periods, each frame period comprising the integration period and the wait period, wherein each column of micromirrors of the plurality of columns of micromirrors are successively controlled to concurrently move from the respective primary positions of the column of micromirrors to the respective first tilt positions of the column of micromirrors in different wait periods of different frame periods.

10. The method of claim 1, wherein the micromirror array comprises a digital micromirror device.

11. The method of claim 1, further comprising:
controlling the at least one micromirror in the first subset to move to a second tilt position of the at least one micromirror to reflect the energy from the ROI toward a third sensor.

12. The method of claim 11, wherein the first sensor generates new sensor data during each frame period of a plurality of frame periods, each frame period comprising the integration period and the wait period, wherein the at least one micromirror in the first subset of micromirrors is controlled to move from the primary position of the at least one micromirror to the first tilt position of the at least one micromirror to reflect the energy from the first ROI toward the second sensor during a wait period of a first frame period, and the at least one micromirror in the first subset of micromirrors is subsequently controlled to move to the second tilt position of the at least one micromirror to reflect the energy from the first ROI toward the third sensor during the wait period of the first frame period.

13. A system, comprising:
a first sensor configured to generate sensor data that quantifies energy received from a scene within a field of view (FOV) of the first sensor to generate an image;
a micromirror array comprising a plurality of micromirrors that is directed toward the scene;
a processor configured to:
analyze the sensor data to identify a first region of interest (ROI);
identify a first subset of micromirrors of the plurality of micromirrors that receive energy from the first ROI during a wait period of a frame period of the first sensor, the frame period comprising an integration period and the wait period; and
control at least one micromirror in the first subset to move from a primary position of the at least one micromirror to a first tilt position of the at least one micromirror to reflect the energy from the first ROI toward a second sensor, the first ROI being spatially isolated from the image,
wherein the first sensor is further configured to generate new sensor data during each frame period of a plurality of frame periods, each frame period comprising the integration period and the wait period, and wherein the processor is further configured to control the at least one micromirror in the first subset of micromirrors to move from the primary position of the at least one micromirror to the first tilt position of the at least one micromirror to reflect the energy toward the second sensor during a wait period of a first frame period.

14. The system of claim 13, wherein the processor is further configured to control the at least one micromirror to return to the primary position prior to a next frame period that immediately follows the first frame period.

15. The system of claim 13, wherein the processor is further configured to:

iteratively, for each frame period of a plurality of successive frame periods:
control the at least one micromirror in the subset of micromirrors to tilt and reflect the energy toward the second sensor during the wait period of the each frame period; and
control the at least one micromirror to return to the primary position prior to a next frame period.

16. The system of claim 13, wherein the processor is further configured to:
analyze the sensor data to identify a second ROI;
identify a second subset of the plurality of micromirrors that receive energy from the second ROI, the second subset comprising a different subset from the first subset; and
control at least one micromirror in the second subset to move from a primary position of the at least one micromirror in the second subset to a first tilt position of the at least one micromirror in the second subset to reflect the energy from the second ROI toward a third sensor.

17. A method, comprising:
generating, by a first sensor, sensor data that quantifies energy received from a scene within a field of view (FOV) of the first sensor to generate an image;
analyzing, by a processor, the sensor data to identify a first region of interest (ROI);
identifying, in a micromirror array comprising a plurality of micromirrors that is directed toward the scene, during a wait period of a frame period of the first sensor, the frame period comprising an integration period and the wait period, a first subset of the plurality of micromirrors that receive energy from the first ROI;
controlling at least one micromirror in the first subset to move from a primary position of the at least one micromirror to a first tilt position of the at least one micromirror to reflect the energy from the first ROI toward a second sensor, the first ROI being spatially isolated from the image;
analyzing, by the processor, the sensor data to identify a second ROI;
identifying, in the micromirror array, a second subset of the plurality of micromirrors that receive energy from the second ROI, the second subset comprising a different subset from the first subset; and
controlling at least one micromirror in the second subset to move from a primary position of the at least one micromirror in the second subset to a first tilt position of the at least one micromirror in the second subset to reflect the energy from the second ROI toward a third sensor.

18. The method of claim 17, wherein controlling the at least one micromirror in the first subset to move from the primary position of the at least one micromirror to the first tilt position of the at least one micromirror to reflect the energy from the first ROI toward the second sensor further comprises:
controlling the at least one micromirror in the first subset to move from the primary position of the at least one micromirror to the first tilt position of the at least one micromirror to reflect the energy from the first ROI toward the second sensor while concurrently controlling the at least one micromirror in the second subset to move from the primary position of the at least one micromirror in the second subset to the first tilt position of the at least one micromirror in the second subset to reflect the energy from the second ROI toward the third sensor.

19. The method of claim 18, wherein the first sensor generates new sensor data during each frame period of a plurality of frame periods, the each frame period comprising the integration period and the wait period, wherein the at least one micromirror in the first subset of micromirrors is controlled to move from the primary position of the at least one micromirror in the first subset of micromirrors to the first tilt position of the at least one micromirror to reflect the energy toward the second sensor during a wait period of a first frame period, and the at least one micromirror in the second subset of micromirrors is controlled to move from the primary position of the at least one micromirror in the second subset of micromirrors to the first tilt position of the at least one micromirror to reflect the energy toward the third sensor during the wait period of the first frame period.

* * * * *